United States Patent [19]

Rude et al.

[11] 4,224,422
[45] Sep. 23, 1980

[54] MODIFIED EPOXY RESIN-POLYISOCYANATE RESIN SYSTEM

[75] Inventors: Harold E. Rude, Roseville; Richard G. Newell, Woodbury, both of Minn.

[73] Assignee: Minnesota Mining and Manufacturing Company, St. Paul, Minn.

[21] Appl. No.: 52,847

[22] Filed: Jun. 28, 1979

[51] Int. Cl.² .................. C08G 59/40; C08G 18/04
[52] U.S. Cl. ............................. 525/454; 525/936; 528/48; 528/51; 528/55; 528/58; 528/73
[58] Field of Search .................. 525/454, 936, 404; 528/48, 51, 55, 58, 73

[56] References Cited

U.S. PATENT DOCUMENTS

| | | | |
|---|---|---|---|
| 3,198,851 | 8/1965 | Moy | 260/836 |
| 3,242,108 | 3/1966 | McCrary et al. | 260/2.5 |
| 3,318,824 | 5/1967 | Graham et al. | 260/2.5 |
| 3,702,839 | 11/1972 | Glasgow et al. | 260/77.5 AB |
| 3,781,229 | 12/1973 | Smith et al. | 260/2.5 BE |
| 4,118,373 | 10/1978 | Orvik | 528/73 |

Primary Examiner—Earl A. Nielsen
Attorney, Agent, or Firm—Cruzan Alexander; Donald M. Sell; Donald C. Gipple

[57] ABSTRACT

Curable expoy resin-polyisocyanate systems which incorporate a minor amount of a cationically polymerizable, ethylenically unsaturated monomer and which are catalyzed by a Lewis acid.

26 Claims, No Drawings

MODIFIED EPOXY RESIN-POLYISOCYANATE RESIN SYSTEM

BACKGROUND OF THE INVENTION

The present invention relates to curable modified epoxy resin polyisocyanate systems.

Curable epoxy resin polyisocyanates have been known heretofore and have been found to be highly useful in many protective coating, casting, potting and electrical insulation applications due to their combination of resistance to high temperature and water vapor with excellent mechanical properties. Although once in place and cured, such resins have highly useful properties, they do not have the rapid rates of gellation and curing which are often needed in modern high speed manufacturing operations.

THE PRESENT INVENTION

The resin systems of the present invention combine the resistance to high temperature and water vapor and excellent mechanical properties of the prior art epoxy resin-polyisocyanate systems with rapid gellation and curing rates. Briefly, this is accomplished by incorporating a minor amount of a cationically polymerizable, ethylenically unsaturated monomer (such as styrene) and curing with a Lewis acid. The resin systems of the invention are unconventional, combining as they do monomers which polymerize by different mechanisms and under different conditions. And the advantageous results obtained are certainly unpredictable.

More specifically the present invention relates to curable liquid resin systems which comprise (A) 0.01–5.0 parts of a Lewis acid,
(B) 1–30 parts of a polyol which is a liquid or soluble waxy solid (at ordinary room temperatures, e.g. 20°–25° C.) having an hydroxy equivalent weight of from about 30 to 2000,
(C) 1–50 parts of a polyisocyanate having an equivalent weight of up to about 380 and a functionality of from 2 to about 6,
(D) 20–90 parts of an epoxy resin having an epoxide functionality greater than one and which is substantially free of hydroxyl groups, and
(E) 1–40 parts of a cationically polymerizable ethylenically unsaturated monomer, the sum of (A), (B), (C), (D) and (E) being 100 parts. The invention also relates to solid, cured polymeric products of the reaction of the same proportions of components (A), (B), (C), (D) and (E). Preferably the liquid resin systems of the invention contain about 0.1 to 2 parts of (A), 1.5–20 parts of (B), 20–40 parts of (C), 40–70 parts of (D) and 5–15 parts of (E) and the solid, cured polymers are reaction products of the same.

The epoxy resin, the polyisocyanate and the ethylenically unsaturated monomer (all of which are sometimes referred to herein for convenience as monomers) can be mixed in advance and stored as a liquid or syrup. The Lewis acid catalyst and the polyol are ordinarily also mixed in advance, and the resulting solution (often a complex) is stored until needed. Curing then takes place upon introduction of the Lewis acid-polyol into the mixture of monomers, sometimes requiring heat.

In a particularly preferred aspect to the invention, the catalyst in a latent form is introduced into the monomer mixture. The resulting one-part curable system can then be stored and coated or otherwise applied into its location of ultimate use, the rapid gellation and cure being initiated when desired by application of heat (which activates the catalyst). These relatively stable, curable one-part liquid resin systems comprise rupturable, impermeable microcapsules ordinarily ranging in size from about 0.1 to 20 microns having
(1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and
(2) liquid fills comprising a Lewis acid-glycerol complex, and a Lewis base scavenger for the Lewis acid having a $pK_b$ of from about 6 to 11, there being 0.1 to 35 mole percent of the scavenger based on the moles of Lewis acid in the microcapsules, and a liquid mixture of a polyisocyanate, an epoxy resin and a cationically polymerizable, ethylenically unsaturated monomer, all as previously defined.

The specific amounts of the constituents in these one-part systems are carefully balanced (as they are in all of the resin systems of the invention). Thus, the effective amount of catalyst present is reduced by the amount of the free scavenger present. Strict attention must be paid to the amount of hydroxyl function, if any, in the monomers (e.g. in the epoxy resin) since the hydroxyls could react with free isocyanate groups to form urethane linkages and cause unwanted viscosity increases in the system. Also, it is noted that the constituents of microcapsule shell walls fall within the definitions of constituents (A) and (B) supra and ordinarily are at least partially incorporated into the final cured resin. Thus, they are included within the total amounts of (A) and (B) in the foregoing broad definition of the invention.

The one-part storable systems just described constitute only one aspect (although a preferred aspect) of the broader invention, which includes embodiments in which the catalyst is introduced in an active form into the monomers. These are frequently more convenient in the more slowly gelling systems of the invention (in order to allow for complete mixing and application to the locus of ultimate use).

The microcapsules suitable for use in the present invention are prepared in liquid media and the resulting latent catalyst concentrates (slurries) are ordinarily added directly to the cationically curable resin systems. This eliminates the necessity of separating the microcapsules from the encapsulation medium and effects further economy. However the microcapsules can, if desired, be separated from the medium and mixed into a different liquid medium prior to use or they can be mixed directly into a resin system to be catalyzed or into a component thereof.

The microencapsulation process involves the formation of a shell wall utilizing the interfacial polycondensation product of a cycloaliphatic epoxy resin, glycerol and an aromatic polyisocyanate on the surface of a droplet of catalyst in either a potentially reactive or non-reactive microencapsulation medium (as those terms are explained hereinafter). More specifically it comprises (a) dispersing and maintaining discrete droplets of a Lewis acid-polyhydric alcohol (glycerol) complex in a liquid medium selected from aromatic polyisocyanates having an equivalent weight of up to about 380 and a functionality of from about 2 to 6 and esters of an aromatic carboxylic acid and an alkyl, aralkyl or aryl alcohol, the ester containing up to about 40 carbon atoms, and (b) adding to said liquid medium a composition comprising an aromatic polyisocyanate as defined above and a cycloaliphatic polyepoxide having an equivalent weight of from about 70 to 220 and a functionality of from about 2 to 3.

Interfacial polycondensation occurs at the droplet surfaces to form a slurry of rupturable microcapsules having shell walls of a crosslinked interfacial polyurethane-polyether reaction product of the aromatic polyisocyanate, glycerol and the cycloaliphatic polyepoxide and liquid fills comprising the Lewis acid-alcohol complex.

The resulting concentrates normally (and preferably) contain from about 1 to 50 parts (by weight) of the microcapsules and 50 to 99 parts of the liquid medium, the sum of the two being 100 parts. A more preferred class are those concentrates which contain from about 10 to 40 parts of the microcapsules and 60 and 90 parts of the liquid medium (the sum of the two being 100 parts).

The microcapsules are preferably the reaction products of (a) 5-25 parts of the Lewis acid,
(b) 5-30 parts of the aromatic polyisocyanate,
(c) 5-20 parts of the cycloaliphatic polyepoxide and
(d) 25-75 parts of glycerol, the sum of (a), (b), (c) and (d) in the microcapsules being 100 parts.

A stabilizer in the form of a scavenger for any catalyst remaining unencapsulated is normally added after the encapsulation, or it can be added later, e.g. when the capsule concentrate is mixed with the curable resin.

Catalysts suitable for use in the microcapsules are well known to the art and include Lewis acids and Lewis acid-derived Brönsted acids, for example $BF_3$, $SnCl_4$, $SbCl_5$, $SbF_5$, $PF_5$, $HBF_4$, $HPF_6$ and $HSbF_6$. These compounds are all referred to herein, for convenience, as Lewis acids. They are complexed with or dissolved in the polyhydric alcohol in order to form a liquid catalyst material which can be readily handled and effectively utilized in the microencapsulation process (the term "complexes", when used herein in connection with the Lewis acid-polyol combination, includes any chemical reaction products which may be present, and the term "solutions" includes "complexes" and solutions in which no chemical interaction takes place). This liquid is relatively insoluble in the medium under the conditions of encapsulation (i.e. will form droplets when dispersed therein).

The preferred polyhydric alcohol, glycerol, is hydroscopic and, as used, normally contains a minor amount of water, e.g. 0.1 to 5 percent, although it can contain up to 50 percent of water. The amounts of the polyhydric alcohol (glycerol) as given herein include this water. An excess of the glycerol is ordinarily used (over that required to complex with the Lewis acid), and some of the free hydroxyl groups at the surface of the droplets are believed to react with the shell wall components during encapsulation and thereby participate in the formation of the shell walls. When released from capsules dispersed in a cationically-curable resin, the glycerol will mix with the resin and participate in its polymerization.

The liquid medium in which the encapsulation takes place must be chosen so that its characteristics relate suitably to those of the other materials present during encapsulation as well as those of the resin into which the capsules are to be dispersed. Thus, the relative viscosities, solubilities and surface tension properties of the encapsulation medium and the fill material are important factors in forming an adequate suspension of the fill material in the encapsulation medium with droplets of the desired size. The size of the droplet of fill material will determine the ultimate size of the microcapsules. It appears, furthermore, that the partition coefficient of the shell wall components between the encapsulation medium and the fill material is important to the formation of functionally impermeable shell walls, i.e. which effectively isolate the liquid fill under conditions of storage. Finally, the encapsulation medium must be compatible with the cationically polymerizable resin to be catalyzed since the microcapsules are generally introduced into it as a concentrate of capsules in the encapsulating medium.

The aromatic polyisocyanate encapsulation media take part in the encapsulation reaction itself and are subsequently reactive with one or more components of the one-part curable systems under curing conditions. Hence, they are often referred to herein as reactive media. The ester encapsulation media do not take part a cationically curable system under conditions of storage (while the microcapsules remain intact).

Representative of the aromatic polyisocyanates which are suitable for use in the present invention, as component (C) as well as in the encapsulation, are m-phenylene diisocyanate, mixtures of toluene-2,4-diisocyanate and toluene-2,6-diisocyanate, diphenyl-3,3'-dimethyl-4,4'-diisocyanate, diphenyl-3,3'-dimethoxy-4,4'-diisocyanate diphenylmethane-4.4'-diisocyanate, diphenylmethane-4,4'-dimethyl-3,3'-diisocyanate and 1,5-naphthalene diisocyanate. The in the encapsulation and they do not react subsequently, e.g. during curing of any cationically curable resin system into which the capsule-medium slurry is mixed. Hence, they are often referred to herein as non-reactive media. Of course, neither type of medium is reactive in diphenyl-3,3'-dimethyl-4,4'-diisocyanate, diphenyl-3,3'-dimethoxy-4,4'-diisocyanate, diphenylmethane-4,4'-diisocyanate, diphenylmethane-4,4'-dimethyl-3,3'-diisocyanate and 1,5-naphthalene diisocyanate. The so-called polymeric aromatic polyisocyanates, such as those obtained by phosgenation of polyamines and by condensing formaldehyde with aromatic amines, can also be used. The commercially available products of these types are often mixtures of materials containing minor proportions of molecules having equivalent weights and functionalities outside the limits set hereinabove and which might, in pure form, even be solids at ordinary temperatures. However, such products are referred to herein (as is customary) in terms of averages of equivalent weight and functionality and are suitable for use in the present invention. Particularly useful polyphenyl polyisocyanates have an average of from about 2 to 2.8 isocyanate groups per molecule such as those sold commercially under the trade designations "Mondur" MR and MRS (available from the Mobay Company) and "PAPI 901" (available from the Upjohn Company).

The non-reactive (ester) encapsulation media are preferably the phthalate and trimellitate esters of alkyl or arylalkyl alcohols having from 1 to 20 carbon atoms, for example dimethyl phthalate, diethyl phthalate, dibutyl phthalate, dioctyl phthalate, butylbenzyl phthalate and tri-(α-ethylhexyl)trimellitate. Butylbenzyl phthalate and tri-(α-ethylhexyl)trimellitate are the presently preferred non-reactive encapsulation media.

Exemplary of the cycloaliphatic polyepoxides which are suitable as shell wall components are difunctional compounds such as vinylcyclohexenedioxide, 3,4-epoxycyclohexylmethyl 3,4-epoxycyclohexanecarboxylate and bis(3,4-epoxy-6-methylcyclohexylmethyl)adipate. These are available from the Union Carbide and Carbon Corp. under the trade designations "ERL 4206", "ERL 4221" and "ERL 4289", respectively.

By the proper choice of constituents (particularly the encapsulation medium) and stirring conditions, the size ranges of droplets of the glycerol catalyst complex can be varied. The size of the droplets of catalyst in the encapsulation medium is also affected by the temperature of the system. The lower the temperature the smaller are the droplets for a given shear system. This temperature effect can, for example, be achieved with a non-reactive medium (such as tri-(α-ethylhexyl)trimellitate or butylbenzyl phthalate). Thus, droplet sizes of 1-10 microns can be obtained with high speed stirring and cooling to 0° to 10° C. while larger droplets result from lower speed stirring and higher temperatures. Addition of shell wall-forming materials then results in capsules approximating the size of the droplets.

When a polyisocyanate is used as the encapsulation medium, rapid stirring of the components will provide droplets of catalyst complex or solution in the range of 0.1-20 microns while slower stirring will yield larger droplets.

Various types of conventional stirring apparatus can be used. Home food blenders as well as laboratory stirrers and blenders can be used depending upon the size of droplet required. The speed required to form droplets of a given size is a function of the type of stirrer blades used, the configuration of the container and the amount of material to be dispersed.

The optimum rate of addition of the shell wall-forming components to the stirred dispersion of the catalyst complex in the encapsulation medium is a function of the encapsulation medium that is being employed. If a non-reactive encapsulation medium is being used, the shell wall formation is slower and better quality capsules are obtained if the shell wall components are added at a relatively slow rate, e.g. 30 to 60 minutes. If a reactive encapsulation medium (such as a polyisocyanate) is used, a rapid addition of the wall-forming components yields good microcapsules since shell wall formation is also very rapid. Thus, with a reactive encapsulation medium the shell wall-forming components may be added over a time period of about 30-120 seconds or more for a typical laboratory-size batch (e.g. 1 kilogram).

The encapsulation process is generally carried out at temperatures ranging from about 0° to 40° C. Due to the speed of capsule formation with a reactive encapsulation medium, a considerable amount of heat is generated within a short time. If the temperature of the system is permitted to rise above 40° C., polymerization of the encapsulation medium can result and cooling may be necessary. Preferably the temperature of the system during the microencapsulation procedure should remain below about 30° C.

The capsule concentrate (the capsules in the encapsulation medium) is ready for use as soon as the encapsulation process is completed. Ordinarily and preferably no medium is removed. If a reactive medium has been used, it reacts to become part of the final resin product, and it must be considered in the material balance of the constituents to assure that substantially complete reaction of the reactive species is ultimately achieved. If a non-reactive medium has been used, it serves as a plasticizer in the final resin product. The concentrate generally contains from about 1 to 10 percent by weight of the Lewis acid catalyst.

During the encapsulation process a small proportion of the catalyst complex ordinarily becomes entrained in the encapsulation medium, thereby escaping encapsulation. Removal of this free catalyst is necessary in order to prevent premature curing of the cationically polymerizable resin system to which it is ultimately added. This is accomplished by adding a Lewis base which is strong enough to complex the acid catalyst and prevent during of the cationically polymerizable resin, but which is a not strong enough base to effect the polymerization of the resin itself. Lewis bases having a p$K_b$ of about 6–11 have been found to be satisfactory. These scavenger materials can be added to either the capsule concentrate or to the curable resin upon preparing the one-part system. The amount of scavenger needed is generally between about 0.1 and 35 mole percent (based upon the number of moles of catalyst present). Preferably about 6–12 mole percent of the scavenger is used with a non-reactive encapsulation medium and about 1–4 mole percent thereof with a reactive medium.

Suitable scavengers include the following: dimethylformamide, dibutylformamide, 2,6-lutidine, 2,5-diacetylimidazole, 3-benzoylpyridine, acridine, 1,1'-carbonyldiimidazole, methyl nicotinate, 2,7-dimethylquinoline, 1,2,4-trimethylpiperazine, 2,5-dimethylpyrazine, 4-pyridine carboxaldehyde, 3-acetylpyridine, quinoline, 2,4,6-trimethylpyridine, methyl isonicotinate, acetonitrile and dimethylsulfoxide. The preferred scavengers for the phthalate ester system are 2,6-lutidine, acridine, methyl isonicotinate and 1,1'-carbonyldiimidazole. The preferred scavengers for the isocyanate system are dimethylformamide, methyl isonicotinate, acridine and 1,1'-carbonyldiimidazole.

Substantially complete capsule rupture or dissolution can be achieved by heat or by solvents. Any solvent which disrupts the continuity of the shell wall will activate the one-part curable systems, e.g. polar solvents like low molecular weight alcohols and acetone.

The most suitable epoxy materials, (D) above, for use in the resin systems of the invention are resins having an epoxide equivalent number of 2.0 or greater. Included are bisphenol A-based epoxy resins such as bisphenol A diglycidyl ether, bisphenol F diglycidyl ether, aliphatic epoxides, cycloaliphatic epoxides, epoxy novolak and heterocyclic-type epoxy resins. These should, as previously noted, be substantially free of hydroxyl groups, since the isocyanate groups will react with hydroxyl groups to form urethanes. In some instances a small amount of hydroxyl functionality may be useful since the reaction of the isocyanate group with the hydroxyl group will cause an increase in viscosity and this mechanism can be used as a means by which the viscosity of the final one-part systems may be regulated.

Suitable cationically polymerizable, ethylenically unsaturated monomers, (E) above, include styrene, limonene, isobutylene, vinyl carbazole, vinyl isobutyl ether, 2,5-dimethyl-2,4-hexadiene, diethyleneglycol divinyl ether, etc.

Various additives, including fillers, plasticizers and reactive diluents can be used with the one-part curable systems to modify their properties and render them more suitable for particular end uses. Fillers and plasticizers can ordinarily be added to systems, but reactive diluents must be added with care. Suitable fillers may be powdered, granular, particulate or fibrous and include clay, talc, glass beads or bubbles, glass fibers, mineral powders, mineral particles, metal powders, titanium dioxide, silicon carbide, carbon black, mica, silica, sand, mineral fibers and the like. The phthalate esters used as non-reactive encapsulation media are examples of plasticizers.

The reactive diluents, referred to previously, are added, for example, to change cure times and to modify the properties of the cured polymer. The reactivity of the diluent also often governs the gel time and affects the latency of the sample. They may include hydroxyl-terminated tackifiers, long-chain polyols polyesters, anhydrides, beta- or gamma-butyrolactone, dioxane, trioxane and the like. The reactive diluents may be added in amounts of up to about 50 percent based upon the total weight of the system, e.g. from about 1 to 100 parts of the reactive diluent based on 100 parts of the catalyst (I) together with the monomer system (II).

In order to promote reactivity between the polyisocyanate and the epoxy resin, urethane catalysts may be added to the system. Examples of urethane catalysts are stannous octoate, diacetoxydibutyltin, dibutyltindilaurate, lead naphthanate and phenylmercury oleate. The capsule-containing systems in which there is no unencapsulated hydroxyl functionality exhibit good shelf stability even with urethane catalysts present. The urethane catalyst can be present to the extent of about 0.05 to 0.5 percent based on the total weight of the system.

The curable liquid resin systems of the invention are useful in many applications where epoxy resins are currently being employed. In particular, they are useful as adhesives. The preferred latent one-part systems are especially valuable since they remain liquid until the catalysts therein are activated upon application of heat (they have excellent shelf stability at room temperature). Upon activation of the catalyst by heat they cure rapidly without release of solvent. Since the polymerization catalyst is already distributed throughout the resin, there is no need for costly and complicated two-part meter mix equipment.

The preferred capsule-forming ingredients are boron trifluoride, glycerol, "ERL 4221" cycloaliphatic polyepoxide and "Mondur MRS" aromatic polyisocyanate (both of which are defined elsewhere herein), and dimethylformamide is the preferred scavenger. In the continuous phase (in both the latent systems and those in which gellation and curing take place upon mixing), "Mondur MRS" is the preferred aromatic polyisocyanate and styrene and limonene are preferred as the ethylenically unsaturated monomer. Bisphenol A diglycidyl ether is the preferred epoxy resin in the continuous phase, although others can be advantageously used as well.

The following non-limiting examples will further illustrate the practice of the invention. Unless otherwise indicated, all parts, proportions and percentages (in the examples and throughout the specification and claims) are by weight, and all viscosities are measured using a Brookfield viscometer.

The gel times reported in the examples are run at specific elevated temperatures (e.g. 150° C.). A drop of the one-part system to be tested is placed on a glass cover slip which is being heated to the appropriate temperature by a Kofler Heizbank gradient temperature heating bar. The time required for the droplet to gel completely is recorded. Also, unless otherwise indicated, the gel times are determined on freshly prepared (not aged) samples.

Certain products utilized frequently in the examples are referred to therein for convenience by short descriptive phrases identified as follows:

Polyisocyanate I. A polymethylenepolyphenylisocyanate having a molecular weight of about 380 and an average isocyanate equivalent weight of 133 (thus containing about 2.6 isocyanate groups per molecule) available from the Mobay Company under the trade designation "Mondur MRS".

Polyisocyanate II. A polyfunctional aliphatic isocyanate having an average isocyanate equivalent weight of 195, available from the Mobay Company under the trade designation "Desmodur N-100".

Polyisocyanate III. A cycloaliphatic difunctional isocyanate: isophorone diisocyanate.

Cycloaliphatic polyepoxide I. 3,4-Epoxycyclohexylmethyl 3,4-epoxycyclohexanecarboxylate having the formula

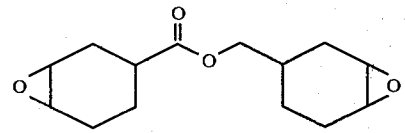

available from the Union Carbide and Carbon Corporation under the trade designation "ERL 4221".

Epoxy resin I. Bisphenol A diglycidyl ether, available commercially from the Dow Chemical Company under the trade designation "DER 332".

Epoxy resin II. Bisphenol A diglycidyl ether, available commercially from the Celanese Coatings and Specialties Company under the trade designation "Epi-Rez 508".

Epoxy resin III. A hydantoin-based diepoxide of the formula

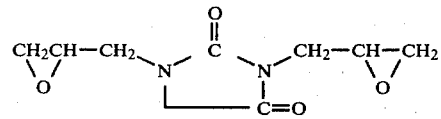

which is available commercially from Ciba-Geigy under the trade designation "XB-2793".

Epoxy resin IV. An aliphatic epoxide: trimethylol propanetriglycidyl ether.

PREPARATION OF CATALYSTS FOR THE LATENT HEAT-CURABLE SYSTEMS

EXAMPLE 1

In reactive medium—capsule size 1–5μ.

One hundred parts of boron trifluoride gas are bubbled directly into 400 parts of glycerol over a 30 minute period with cooling from an ice bath to keep the temperature from exceeding 70° C. to give a 20 percent $BF_3$-glycerol complex. Polyisocyanate I (735 parts) is placed in a stainless steel beaker, cooled to 7°–10° C. in an ice bath and 210 parts of the 20 percent $BF_3$-glycerol complex are dispersed therein with stirring. The stirring apparatus is a Premier Dispersator unit type DD with a 2½ inch diameter (approximately 6.4 cm.) Waring Blendor blade rotating at 4000 rpm. The resulting droplet size range is 1–5μ. A 50:50 solution of polyisocyanate I and cycloaliphatic polyepoxide I (105 parts) is added over a two minute period while maintaining the agitation and cooling (to minimize the temperature rise resulting from the exotherm). The mixture is then stirred less vigorously (2000 rpm) until the temperature drops to 17° C., dimethylformamide (1.05 parts) is added with continual stirring and the mixture is degassed. The resulting capsule concentrate contains 4 percent BF$_3$ catalyst and 2.4 mole percent of dimethylformamide scavenger (based on moles of BF$_3$).

EXAMPLE 2

In reactive medium—with a different Lewis acid.

Capsules are prepared using the procedure and amounts of Example 1, except using a 20 percent antimony pentafluoride-glycerol complex in place of a boron trifluoride-glycerol complex and using 2,6-lutidine (1.54 parts) in place of the dimethylformamide. The resulting capsule concentrate contains 4 percent SbF$_5$ catalyst and 7.4 mole percent of 2,6-lutidine (based on the moles of catalyst).

EXAMPLE 3

In non-reactive medium—capsule size 1-10μ.

Tri-(α-ethylhexyl)trimellitate (66.7 parts) is cooled to 10° C. and stirred at 5000 rpm using the stirring apparatus in Example 1. 20 Percent BF$_3$-glycerol (20 parts) is added and stirred until 1-10μ droplets are obtained. A 50/25/25 solution of cycloaliphatic epoxide I, tri-(α-ethylhexyl)trimellite and toluene-2,4-diisocyanate (13.3 parts) is then added over a 1 to 2 minute period. The resulting mixture is stirred for 30 minutes to give a capsule concentrate which contains 4 percent BF$_3$ catalyst.

THE LATENT, ONE-PART, HEAT-CURABLE SYSTEMS

EXAMPLE 4

Latent, one-part, heat-curable epoxy systems are formulated by mixing 50 parts of epoxy resin I, 15 parts of the 4 percent BF$_3$ capsule concentrate of Example 1, 25 parts of polyisocyanate I and 10 parts of a cationically polymerizable, ethylenically unsaturated monomer. Table I lists these monomers, gel time and aging study data.

TABLE I

| Lot | Monomer | Initial Viscosity (cps) | Viscosity of Aged Sample (cps) | Age of Sample (days) | Gel Time of Aged Samples (sec/°C.) |
|---|---|---|---|---|---|
| C | Styrene | 250 | 25,000 | 65 | 5/150 |
| D | Styrene | 250 | 150,000 | 129 | 7/150 |
| E | D-limonene | 6,100 | 37,500 | 129 | 20/150 |

EXAMPLE 5

With various proportions of components and reactive diluents.

The capsule concentrate of Example 1 is used in the formulations of this example. The resulting viscosity and gel time tests (Table II) show that the more polyisocyanate present in a given system, the less its reactivity and the greater its stability.

TABLE II

| Lot | Formulation | Age of Sample (days) | Viscosity (cps) | Gel Time of Aged Samples (sec/°C.) |
|---|---|---|---|---|
| A | 50 parts Epoxy Resin II<br>10 parts Styrene | 0 | 300 | 10/80 |
|   | 25 parts Polyisocyanate I<br>15 parts Capsule Concentrate | 21 | 440 | 140/100 |
| B | 55 parts Epoxy Resin II<br>10 parts Styrene | 0 | 300 | 10/80 |
|   | 20 parts Polyisocyanate I<br>15 parts Capsule Concentrate | 21 | 975 | 93/100 |
| C | 60 parts Epoxy Resin II<br>10 parts Styrene | 0 | 350 | 10/80 |
|   | 15 parts Polyisocyanate I<br>15 parts Capsle Concentrate | 21 | 37,500 | 35/100 |
| D | 65 parts Epoxy Resin II<br>10 parts Styrene | 0 | 450 | 10/80 |
|   | 10 parts Polyisocyanate I<br>15 parts Capsule Concentrate | 21 | 93,500 | 13/100 |

The systems reported in Table III are prepared using the 4 percent BF$_3$ capsule concentrate of Example 1.

TABLE III

| Lot | Formulation | Initial Viscosity (cps) | Viscosity of Aged Sample (cps) | Age of Sample (days) | Gel Time of Aged Samples (sec/°C.) |
|---|---|---|---|---|---|
| E | 57 parts Epoxy Resin II<br>11 parts Styrene<br>22 parts Polyisocyanate I<br>10 parts 4% BF$_3$ Capsule Concentrate | 200 | 575 | 7 | 10-15/150 |
| F | 57 parts Epoxy Resin I<br>11 parts Styrene<br>16 parts Polyisocyanate II<br>16 parts 4% BF$_3$ Capsule Concentrate | 450 | 810 | 3 | 45/150 |
| G | 57 parts Epoxy Resin IV<br>11 parts Styrene<br>16 parts Polyisocyanate I<br>16 parts 4% BF$_3$ Capsule Concentrate | 650 | 2,900 | 0.3 | 8/150 |

EXAMPLE 6

Castings from a composition containing styrene.

55 parts Epoxy Resin I
10 parts Styrene
20 parts Polyisocyanate I
15 parts 4% BF$_3$ Capsule Concentrate (of Example 1)

Castings suitable for use as testing specimens are prepared from this formulation and cured for 15 minutes at 150° C. The average tensile strength of five replicate samples is 3,800 psi (266 kg/cm$^2$), and the average elongation at break is 4.7 percent.

Useful one-part, curable systems of the invention are also prepared by dispersing the catalyst concentrates of Examples 1-3 (stabilized with suitable scavengers) in cationically polymerizable monomers including isobutylene, vinyl carbazole, vinyl isobutyl ether, 2,5-dimethyl-2,4-hexadiene, etc.

THE SYSTEMS WHICH CURE UPON MIXING

EXAMPLE 7

The lots shown in Table IV are prepared by the following general procedure: A mixture of 0.210 equivalent of isocyanate functionality, 0.326 equivalent of epoxide functionality, 0.106 equivalent of unsaturation, 0.080 equivalent of hydroxyl functionality and 0.16–1.17 percent of catalyst is rapidly hand mixed for 10 to 15 seconds when possible, the premixed polyol and catalyst being added last. The mixed resin is poured into a 2⅛″ diameter aluminum dish and three ¼″-×½″×5″ molds. The remaining resin, about 25 g., is monitored for gel time at room temperature. The gelled molds are post cured for 20 hours at 150° C. to give the finished high temperature performance molded articles.

In Table IV, DPG is dipropylene glycol and PCP-200 is polycaprolactone-polyester polyol of 200 molecular weight.

TABLE IV

| Lot | Formulation | Percent Catalyst | Gel Time (R.T.) |
|---|---|---|---|
| A | 27.70 g. Polyisocyanate I<br>57.00 g. Epoxy Resin I<br>11.00 g. Styrene<br>5.96 g. 10% $BF_3$—DPG | 0.59 | 35 sec. |
| B | 40.95 g. Polyisocyanate II<br>57.00 g. Epoxy Resin I<br>11.00 g. Styrene<br>5.96 g. 10% $BF_3$—DPG | 0.52 | >30 min. |
| C | 23.31 g. Polyisocyanate III<br>57.00 g. Epoxy Resin I<br>11.00 g. Styrene<br>5.96 g. 10% $BF_3$—DPG | 0.61 | 45 sec. |
| D | 27.70 g. Polyisocyanate I<br>57.00 g. Epoxy Resin I<br>14.44 g. Limonene<br>5.96 g. 10% $BF_3$—DPG | 0.57 | 1 min., 14 se. |
| E | 27.70 g. Polyisocyanate I<br>57.00 g. Epoxy Resin I<br>8.37 g. Diethyleneglycol Divinyl Ether<br>2.98 g. 10% $BF_3$—DPG<br>2.68 g. DPG | 0.30 | 7 sec. |
| F | 27.70 g. Polyisocyanate I<br>57.00 g. Epoxy Resin I<br>11.00 g. Styrene<br>6.70 g. 20% $HSbF_6$—DPG | 1.17 | 5 min., 12 sec. |
| G | 27.70 g. Polyisocyanate I<br>57.00 g. Epoxy Resin I<br>11.00 g. Styrene<br>1.00 g. 50% $SbF_5$—DPG<br>4.72 g. DPG | 0.49 | 1 min., 35 sec. |
| H | 27.70 g. Polyisocyanate I<br>28.50 g. Epoxy Resin I<br>22.33 g. Cycloaliphatic Polyepoxide I<br>11.00 g. Styrene<br>1.49 g. 10% $BF_3$—DPG<br>4.02 g. DPG | 0.16 | 20 sec. |
| I | 27.70 g. Polyisocyanate I<br>52.80 g. Epoxy Resin IV<br>11.00 g. Styrene<br>2.98 g. 10% $BF_3$—DPG<br>2.68 g. DPG | 0.31 | 55 sec. |
| J | 27.70 g. Polyisocyanate I<br>45.00 g. Epoxy Resin III<br>11.00 g. Styrene<br>5.96 g. 10% $BF_3$—DPG | 0.66 | >30 min. |
| K | 27.70 g. Polyisocyanate I<br>57.00 g. Epoxy Resin I<br>11.00 g. Styrene<br>5.96 g. 10% $BF_3$—PCP 200<br>15.85 g. PCP 200 | 0.51 | 51 sec. |

Table V shows the Knoop Hardness, the Thermal Gravimetric Analysis and the Vicat Softening Points of the cured articles of the corresponding lots of Table IV. The Knoop Hardness is obtained on a Tukon Hardness Tester with a 100 gram load using a diamond indenter, the TGA is carried out on a Perkin-Elmer TGS-1 instrument at a heating rate of 40° C. per minute and the procedure of ASTM-D1525 is utilized for the Softening Points (loading a one square millimeter probe with 1 kg. of weight and measuring the probe's penetration of the polymer over a 40° C. to 220° C. range at a temperature increase of 2° C. per minute).

TABLE V

| | Knoop | TGA (°C.) | | | Softening Points |
|---|---|---|---|---|---|
| Lot | Hardness | 10% | 20% | 50% | Temp. (°C.)-min : penetration (mm)<br>Temp. (°C.)-max : penetration (mm) |
| A | 19.4 | 389 | 421 | 454 | 65–85 : −0.03<br>195–220 : +0.08 |
| B | 15.4 | 368 | 400 | 457 | 45–60 : −0.01<br>90–100 : +0.13 |
| C | 18.5 | 378 | 402 | 440 | 85–110 : −0.04<br>155–160 : +0.08 |
| D | 22.4 | 347 | 392 | 445 | 40–70 : −0.02<br>215 : +0.21 |
| E | 17.6 | 387 | 424 | 457 | 90–105 : −0.06<br>205–220 : +0.04 |
| F | 18.7 | 394 | 438 | 480 | 120–170 : −0.06<br>215–220 : +0.01 |
| G | 23.1 | 394 | 442 | 480 | 100–120 : −0.03<br>220 : +0.07 |
| H | 26.7 | 392 | 421 | 452 | 65–75 : −0.03<br>220 : +0.26 |
| I | 18.7 | 354 | 359 | 433 | 160–220 : −0.07<br>40 : −0.01 |
| J | 29.1 | 378 | 402 | 485 | 60–140 : −0.02<br>220 : +0.11 |
| K | 15.6 | 387 | 428 | 459 | 60–85 : −0.03<br>190–220 : 0.00 |

What is claimed is:

1. A curable liquid resin system which comprises
   (A) 0.01–5.0 parts of one or more Lewis acids,
   (B) 1–30 parts of one or more polyols which are liquid or soluble waxy solids having hydroxy equivalent weight of from about 30 to 2000, (C) 1–50 parts of one or more polyisocyanates having equivalent weights of up to about 380 and functionalities of from about 2 to about 6, (D) 20–90 parts of one or more epoxy resins having epoxide functionalities greater than one and which are substantially free of hydroxyl groups and (E) 1–40 parts of one or more cationically polymerizable ethylenically unsaturated monomers, the sum of (A), (B), (C), (D) and (E) being 100 parts.

2. A resin system according to claim 1 comprising 0.1 to 2 parts of (A), 1.5–20 parts of (B), 20–40 parts of (C), 40–70 parts of (D) and 5–15 parts of (E).

3. A resin system according to claim 1 wherein the Lewis acid component is boron trifluoride.

4. A resin system according to claim 1 wherein the polyol component is glycerol.

5. A resin system according to claim 1 wherein the polyisocyanate component is a polymethylene-polyphenylisocyanate having a molecular weight of about 380 and an average isocyanate equivalent weight of 133.

6. A resin system according to claim 1 wherein the epoxy resin component contains 3,4-epoxycyclohexylmethyl 3,4-epoxycyclohexanecarboxylate.

7. A resin system according to claim 1 wherein the epoxy resin component contains bisphenol A diglycidyl ether.

8. A resin system according to claim 1 wherein the ethylenically unsaturated monomer component is styrene.

9. A resin system according to claim 1 wherein the ethylenically unsaturated monomer component is limonene.

10. A curable one-part liquid resin system according to claim 1 which comprises rupturable, impermeable microcapsules ranging in size from about 0.1 to 20 microns having (1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and (2) liquid fills comprising a Lewis acid-glycerol complex, and a Lewis base scavenger for the Lewis acid having a $pK_b$ of from about 6 to 11, there being 0.1 to 35 mole percent of the scavenger based on the moles of Lewis acid in the microcapsules, and a liquid mixture of a polyisocyanate, an epoxy resin and a cationically polymerizable, ethylenically unsaturated monomer.

11. A curable one-part liquid system according to claim 10 which comprises rupturable, impermeable microcapsules ranging in size from about 0.1 to 20 microns having (1) shell walls of a crosslinked interfacial polyurethane-polyether reaction product of a polymethylene polyphenylisocyanate having a molecular weight of about 380 and an average isocyanate equivalentl weight of 133, glycerol and 3,4-epoxycyclohexylmethyl 3,4-epoxycyclohexanecarboxylate, and (2) liquid fills comprising a boron trifluoride-glycerol complex, dimethylformamide as the scavenger, and a liquid mixture of an aromatic isocyanate as defined above, bisphenol A diglycidyl ether and an ethylenically unsaturated monomer selected from styrene and limonene.

12. A curable one-part liquid system according to claim 11 which comprises substantially (A) 0.64 part of boron trifluoride, (B) 2.56 parts of glycerol, (C) 28 parts of the aromatic polysiocyanate, (D) 0.80 part of the cycloaliphatic polyepoxide and 57 parts of the bisphenol A diglycidyl ether, (E) 11 parts of styrene, and 2.4 mole percent of dimethylformamide scavenger based on the amount of boron trifluoride present.

13. A curable one-part liquid system according to claim 11 which comprises substantially (A) 0.64 part of boron trifluoride, (B) 2.56 parts of glycerol, (C) 27 parts of the aromatic polyisocyanate, (D) 0.80 part of the cycloaliphatic polyepoxide and 56 parts of the bisphenol A diglycidyl ether, (E) 13 parts of limonene, and 2.4 mole percent of dimethylformamide scavenger based on the amount of boron trifluoride present.

14. A solid, cured, polymeric reaction product of (A) 0.01–5.0 parts of one or more Lewis acid, (B) 1–30 parts of one or more polyols which are liquid or soluble waxy solids having hydroxy equivalent weight of from about 30 to 2000, (C) 1–50 parts of one or more polyisocyanates having equivalent weights of up to about 380 and functionalities of from about 2 to about 6, (D) 20–90 parts of one or more epoxy resins having epoxide functionalities greater than one and which are substantially free of hydroxyl groups, and (E) 1–40 parts of one or more cationically polymerizable, ethylenically unsaturated monomers, the sum of (A), (B), (C), (D) and (E) being 100 parts.

15. A cured solid according to claim 14 comprising the reaction product of 0.1 to 2 parts of (A), 1.5–20 parts of (B), 20–40 parts of (C), 40–70 parts of (D) and 5–15 parts of (E).

16. A cured solid according to claim 14 wherein the Lewis acid component is boron trifluoride.

17. A cured solid according to claim 14 wherein the polyol component is glycerol.

18. A cured solid according to claim 14 wherein the polyisocyanate component is a polymethylene polyphenylisocyanate having a molecular weight of about 380 and an average isocyanate equivalent weight of 133.

19. A cured solid according to claim 14 wherein the epoxy resin component contains 3,4-epoxycyclohexylmethyl 3,4-epoxycyclohexanecarboxylate.

20. A cured solid according to claim 14 wherein the epoxy resin component contains bisphenol A diglycidyl ether.

21. A cured solid according to claim 14 wherein the ethylenically saturated monomer component is styrene.

22. A cured solid according to claim 14 wherein the ethylenically unsaturated monomer component is limonene.

23. A solid, cured polymeric reaction product according to claim 14 of rupturable, impermeable microcapsules ranging in size from about 0.1 to 20 microns having (1) shell walls of a crosslinked interfacial polyurethane-polyether reaction product of an aromatic polyisocyanate having an equivalent weight of up to about 380 and a functionality of from about 2 to 6, glycerol and a cycloaliphatic polyepoxide having an equivalent weight of from about 70 to 220 and a functionality of from about 2 to 3, and (2) liquid fills comprising a Lewis acid-glycerol complex, and a Lewis base scavenger for the Lewis acid having a $pK_b$ of from about 6 to 11, there being 0.1 to 35 mole percent of the scavenger based on the moles of Lewis acid in the microcapsules, and a mixture of polyisocyanate, an epoxy resin and a cationically polymerizable, ethylenically unsaturated monomer.

24. A product according to claim 23 of rupturable, impermeable microcapsules ranging in size from about 0.1 to 20 microns having (1) shell walls of a crosslinked interfacial polyurethane-polyether reaction product of a polymethylene polyphenylisocyanate having a molecular weight of about 380 and an average isocyanate equivalent weight of 133, glycerol and 3,4-epoxycyclohexylmethyl 3,4-epoxycyclohexanecarboxylate, and (2) liquid fills comprising a boron trifluoride-glycerol complex, dimethylformamide as the scavenger, and a mixture of an aromatic isocyanate as defined above, bisphenol A diglycidyl ether and an ethylenically unsaturated monomer selected from styrene and limonene.

25. A product according to claim 24 of (A) 0.64 part of boron trifluoride, (B) 2.56 parts of glycerol, (C) 28 parts of the aromatic polyisocyanate, (D) 0.8 part of the cycloaliphatic polyepoxide and 57 parts of the bisphenol A diglycidyl ether, (E) 11 parts of styrene, and 2.4 mole percent of dimethylformamide scavenger based on the amount of boron trifluoride present.

26. A product according to claim 24 of (A) 0.64 part of boron trifluoride, (B) 2.56 parts of glycerol, (C) 28 parts of the aromatic polyisocyanate, (D) 0.8 part of the cycloaliphatic polyepoxide and 56 parts of the bisphenol A diglycidyl ether, (E) 13 parts of limonene, and 2.4 mole percent of dimethylformamide scavenger based on the amount of boron trifluoride present.

* * * * *

UNITED STATES PATENT AND TRADEMARK OFFICE
CERTIFICATE OF CORRECTION

PATENT NO. : 4,224,422
DATED : September 23, 1980
INVENTOR(S) : Harold E. Rude and Richard G. Newell It is certified that error appears in the above—identified patent and that said Letters Patent is hereby corrected as shown below:

In column 4, line 27, part of paragraph omitted. Insert after part -- in the encapsulation and they do not react subsequently, e.g., during curing of any cationically curable resin system into which the capsule-medium slurry is mixed. Hence, they are often referred to herein as non-reactive media. Of course, neither type of medium is reactive in --.

In column 16, line 18, change "(C) 28" to -- (C) 27 --.

Signed and Sealed this

Ninth Day of December 1980

[SEAL]

Attest:

SIDNEY A. DIAMOND

Attesting Officer

Commissioner of Patents and Trademarks